(12) United States Patent
Vukojevic et al.

(10) Patent No.: US 8,639,389 B2
(45) Date of Patent: Jan. 28, 2014

(54) SYSTEM AND METHOD FOR CONTROLLING VOLTAGE ON A DISTRIBUTION FEEDER

(75) Inventors: Aleksandar Vukojevic, Atlanta, GA (US); Borka Milosevic, Smyrna, GA (US)

(73) Assignee: General Electric Company, Schenectady, NY (US)

( * ) Notice: Subject to any disclaimer, the term of this patent is extended or adjusted under 35 U.S.C. 154(b) by 325 days.

(21) Appl. No.: 13/185,953

(22) Filed: Jul. 19, 2011

(65) Prior Publication Data

US 2013/0024040 A1    Jan. 24, 2013

(51) Int. Cl.
*G05D 11/00* (2006.01)

(52) U.S. Cl.
USPC ............................ 700/286; 307/109; 323/257

(58) Field of Classification Search
USPC ............................ 700/286; 307/109; 323/257
See application file for complete search history.

(56) References Cited

U.S. PATENT DOCUMENTS

| | | | |
|---|---|---|---|
| 5,422,561 A | 6/1995 | Williams et al. | |
| 5,646,512 A * | 7/1997 | Beckwith | 323/257 |
| 7,091,703 B2 * | 8/2006 | Folts et al. | 323/207 |
| 8,427,131 B2 * | 4/2013 | Bryson et al. | 323/343 |
| 2005/0251296 A1 * | 11/2005 | Tracy Nelson et al. | 700/292 |
| 2007/0124026 A1 * | 5/2007 | Troxell et al. | 700/291 |
| 2008/0177678 A1 * | 7/2008 | Di Martini et al. | 705/412 |
| 2009/0046400 A1 * | 2/2009 | McCarthy et al. | 361/42 |
| 2009/0290275 A1 * | 11/2009 | Staszesky et al. | 361/63 |
| 2010/0152910 A1 * | 6/2010 | Taft | 700/286 |
| 2011/0066296 A1 * | 3/2011 | Nelson et al. | 700/286 |

OTHER PUBLICATIONS

Grebe, T. E., et al.; "Application of Distribution System Capacitor Banks and Their Impact on Power Quality"; IEEE Transactions on Industry Applications; vol. 32, No. 3; May/Jun. 1996.

* cited by examiner

*Primary Examiner* — Mohammad Ali
*Assistant Examiner* — Anthony Whittington
(74) *Attorney, Agent, or Firm* — Cantor Colburn LLP (57) ABSTRACT

A system for controlling voltage on a distribution feeder includes a plurality of capacitor banks that can be connected to or disconnected from the distribution feeder. A first bank is configured to connect to the distribution feeder when a first voltage is below a first lower threshold value and to connect to the distribution feeder when the first voltage is above a first upper threshold value. The first upper threshold and first lower threshold are determined based off an operational set point. The system further includes a sensor configured to measure the first voltage and a controller in operable communication with the plurality of capacitor banks configured to determine the operational state of the first and second capacitor banks and, based on the first voltage, send a first instruction to the first capacitor bank, the first instruction causing the capacitor bank to vary the operational set point.

15 Claims, 6 Drawing Sheets

SYSTEM AND METHOD FOR CONTROLLING VOLTAGE ON A DISTRIBUTION FEEDER

BACKGROUND OF THE INVENTION

The subject matter disclosed herein relates to power distribution system and, in particular, to varying the operational characteristics of capacitor banks along distribution feeder.

Utilities in various locations are required to deliver power to consumers at a base voltage plus or minus a certain percentage. For example, in the Unites States utilities are required to deliver power to residential consumers at 120 volts plus or minus 5%, which yields a range of 114V to 126V. In Europe, utilities are required to deliver power at 230V plus or minus 10%. It is well known that voltage gradually decreases along distribution feeder lines due to the accumulation of load. To meet the above requirements, one approach is to transmit power with a voltage from a substation at 126 volts to ensure that the last consumer on the line gets at least the minimum standard of 114 volts during peak load. Such transmission, while effective, results in at least some consumers receiving higher than needed voltage which leads to increased energy costs and shortened life expectancy for electrical equipment.

In addition, utilities need to manage reactive power on the distribution feeders. In general, reactive power is "imaginary" power that is created by reactive loads (e.g., loads containing inductive or capacitive elements). Energy storage in the loads results in a time difference between the current and voltage waveforms. During each cycle of the AC voltage, extra energy, in addition to any energy consumed by the load, is temporarily stored in the load in electric or magnetic fields, and then returned to the feeder a fraction of a second later in the cycle. The "ebb and flow" of this nonproductive power increases the current in the feeder. The increased current can reduce the lifetime of components along the feeder.

One approach to offsetting reactive power is to introduce capacitors (typically in the form of shunt capacitor banks) along the feeder. That is, capacitor banks can be used to reduce current throughout the system. In particular, fixed and switched capacitor banks are used as a means of volt-amperes reactive (VAr) management. As part of VAr management, or as a separate endeavor, the capacitor banks can also be used to adjust the voltage profile of voltage along the feeder.

A capacitor bank can be operated in either remote or local operating modes. In a remote mode, a remote control apparatus issues TRIP (open) or CLOSE commands that cause the capacitor bank to be disconnected from (TRIP) or coupled to (CLOSE) the feeder. If a communication loss between the remote control apparatus and the capacitor bank occurs, the capacitor bank typically reverts back to the local operating mode. In a local operating mode, the capacitor bank can automatically connect or disconnect from the feeder based on a predefined criteria (e.g., voltage measured on the feeder, time, VAR, current, outside temperature, etc.). Such operation may be acceptable but can cause voltages on the feeder to change. In particular, if the capacitor has previously been remotely controlled in a manner to allow voltage along the feeder to be kept as low as possible, reverting back to the original settings means higher voltage and, as such, reintroduction of one or more of the problems described above.

BRIEF DESCRIPTION OF THE INVENTION

According to one aspect of the invention, a method for controlling voltage on a distribution feeder, the distribution feeder including a plurality of capacitor banks associated with the power line, the plurality of capacitor banks including a first capacitor bank and a second capacitor bank, the first bank being configured to connect to the distribution feeder when a first voltage is below a first lower threshold value and to disconnect from the distribution feeder when the first voltage is above a first upper threshold value, the first upper threshold and first lower threshold being determined based on an operational set point of the first capacitor bank is disclosed. The method of this embodiment includes: determining at a computing device the operational state of the first and second capacitor banks; measuring the first voltage with a voltage sensor associated with the first capacitor bank; determining whether the first capacitor bank should be connected to or disconnected from the distribution feeder; and sending a first instruction to the first capacitor bank, the first instruction causing the capacitor bank to vary its operational set point.

According to another aspect of the invention, a system for controlling voltage on a distribution feeder is disclosed. The system of this aspect includes a plurality of capacitor banks that can be connected to or disconnected from the distribution feeder, the plurality of capacitor banks including a first capacitor bank and a second capacitor bank. In this aspect, the first capacitor bank is configured to connect to the distribution feeder when a first voltage is below a first lower threshold value and to disconnect from the distribution feeder when the first voltage is above a first upper threshold value. The first upper threshold and first lower threshold are determined based on an operational set point. The system of this aspect also includes a sensor configured to measure the first voltage and a controller in operable communication with the plurality of capacitor banks configured to determine the operational state of the first and second capacitor banks and, based on the first voltage, send a first instruction to the first capacitor bank, the first instruction causing the capacitor bank to vary the operational set point.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
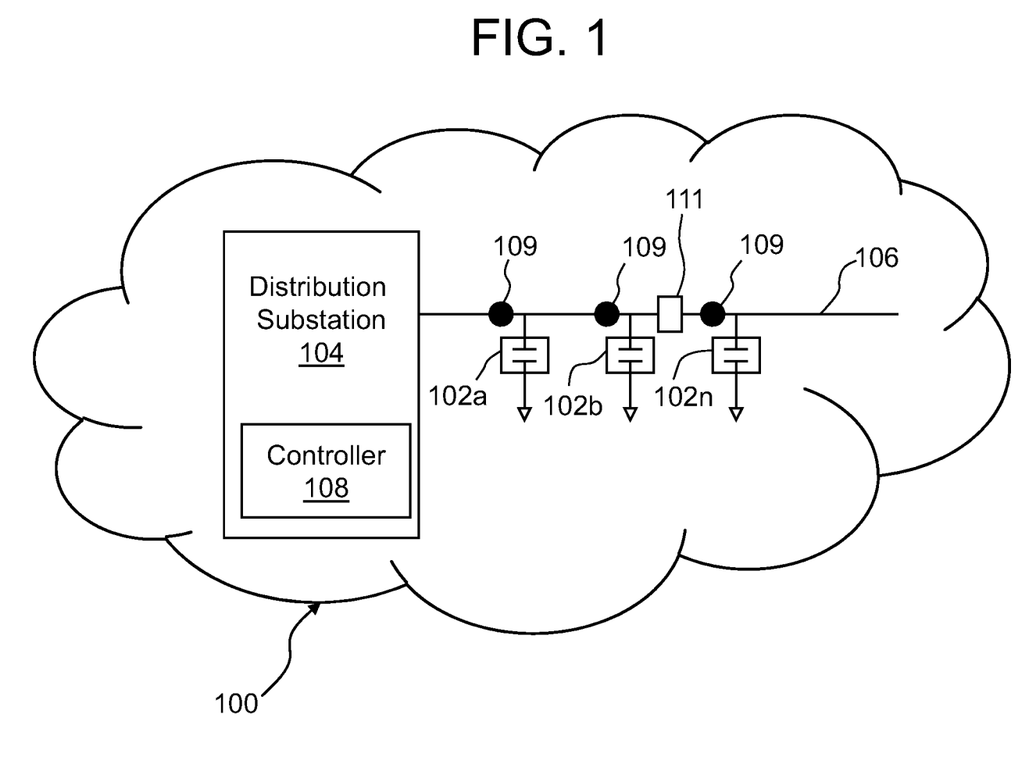
FIG. 1 illustrates a distribution system in which embodiments of the present invention can be implemented.

Referring now to FIG. 1, a portion of a distribution system 100 that includes a plurality of capacitor banks 102a-102n is illustrated. The distribution system 100 also includes a substation 104. The distribution substation 104 receives power from either a transmission or a sub-transmission system. The power is then provided to feeders 106 at distribution voltage levels. As discussed further below, the voltage level on the feeder line 106 can be adjusted based, at least in part, by switching one or more of the capacitor banks 102 in or out of electrical connection with the feeder line 106. In some instances, the decisions about whether a particular capacitor bank 102 should be switched in or out can be made by a controller 108. The controller 108 can make such decisions based on electrical values measured at one more locations along the feeder 106 and the internal control logic. As such, the controller 108 is configured to receive measurements (e.g., voltage measurements) from sensors 109 located along the feeder 106. As illustrated, the sensors 109 are located at or near the capacitor banks 102. In one embodiment, the sensors 109 are located within the capacitor banks 102. Regardless of the exact location, one or more of the sensors 109 are associated with respective capacitor banks 102. In one embodiment, the sensors 109 are voltage sensors. Communication between the controller 108 and the sensors 109 and the capacitor banks 102 can be wired, wireless, or some combination thereof. In one embodiment, the controller 108 is implemented on one or more computing devices.

According to one embodiment, rather than causing various capacitor banks 102 to be switched in or out, the controller 108 adjusts the set points of the capacitor banks 102 and then allows them to operate in a local mode. In this manner, if communication is lost between the controller 108 and the capacitor banks 102, the local capacitor controller will have setting that fit the dynamic conditions on the feeder than the default settings. Accordingly, a technical effect of the present invention is that it provides systems and methods for Volt/VAr management that is less affected by loss of communications than conventional Volt/VAr management methods.

The following explanation deals with providing power in the 120V range. As such, in the following description, it is assumed that the substation 104 has a transformer that reduces the voltage (and increases the current) received from a transmission or sub-transmission substation that is feeding the substation.

According to one embodiment, the set points of the capacitor banks 102 are adjusted in such a manner to create a flatter voltage profile along the length of the feeder line 106. After the voltage profile has been flattened, the voltage at the substation 104 can be lowered. In this manner, the voltage at the capacitor bank 102a can be closer to the voltage at capacitor bank 102n and the voltage drop along the length of the feeder line 106 reduced. One or ordinary skill will realize that the voltage can be lowered at the substation 104 itself or by a transformer with a load tap changer, or voltage regulators 111 disposed inside the substation or at some location along the line 106.

Figure 2:
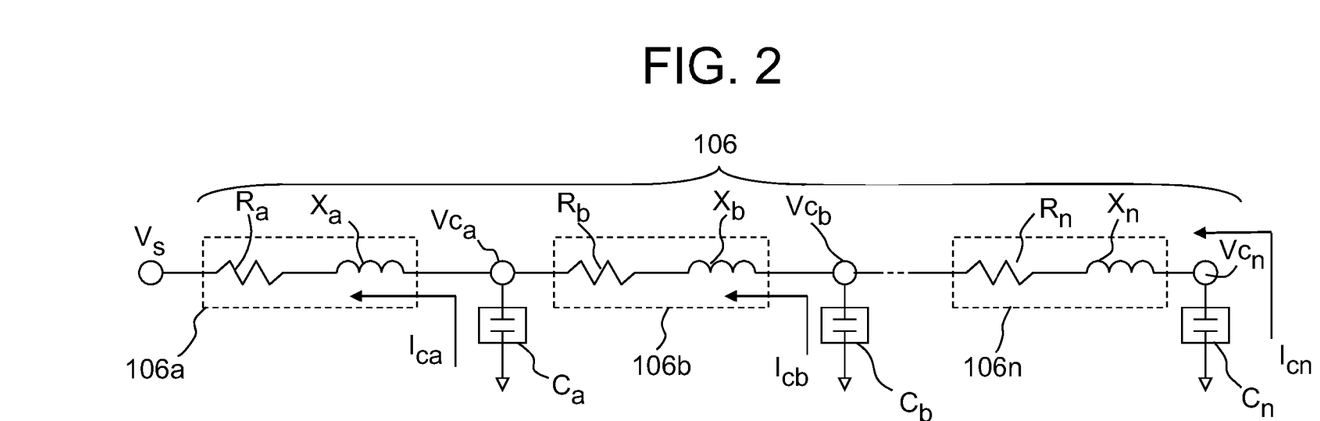
FIG. 2 is a circuit diagram of the system shown in FIG. 1.

FIG. 2 is a circuit diagram of the system 100 shown in FIG. 1. FIG. 2 will be discussed with reference to FIG. 3, which illustrates an example of two voltage profiles 300, 302 along the length of feeder line 106 of FIG. 1. In FIG. 2, the feeder line 106 is generally modeled as sections 106a-106n, each of which includes a resistive component $R_x$ and a reactance $X_x$. The values of $R_x$ and $X_x$ are, of course, dependent on the type of the conductor used, distribution line design, and length of the feeder sections 106. In this example, voltages $Vc_a$ through $Vc_n$ are measured at distances $DVc_x$ from the power source that provides an input voltage of $V_s$. Voltage profiles 300 and 302 represents voltage (Y-axis) along the feeder 106 at the locations where the capacitors $C_a$ through $C_n$ are located. Of course, the voltages $Vc_a$ through $Vc_n$ could be measured at any location on distribution feeder 106.

Figure 3:
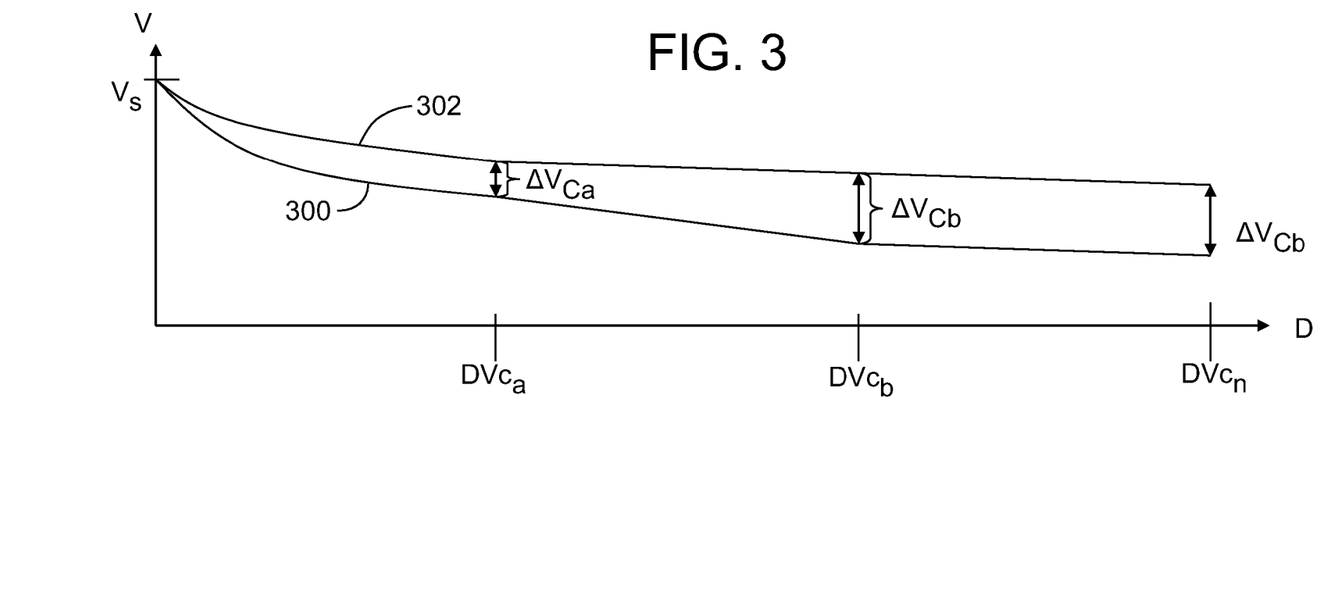
FIG. 3 illustrates an example of two voltage profiles along the length of feeder line 106 of FIG. 1.

Assume that voltage profile 300 represents the situation where capacitor $C_b$ is disconnected from the feeder line 106 and voltage profile 302 represents the situation where capacitor $C_b$ is connected to the feeder line 106. If capacitor $C_b$ is coupled to the feeder line 106 it can be thought of as a reactive power source that produces an imaginary current Lb. This current flows in the opposite direction of power delivery in a radial feeder such as 106 and serves to reduce the imaginary component of current flowing down the feeder line 106. The voltage increases at location $DVc_b$ by a value $\Delta V_{Cb}$. The value of $\Delta V_{Cb}$ can be expressed as shown in Equation 1:

$$\Delta V_{Cb} = (X_a + X_b) I_{cb} \quad (1)$$

As a general rule, the voltage change at every location further away from the source (e.g., downstream) will increase by about the same value of $\Delta V_{Cb}$. For locations closer to the source (e.g., upstream) the voltage increase will be equal to $I_{cb}$ times the sum of the reactance from the location to the source. In the example in FIGS. 2 and 3, this can be seen by the difference between voltage profile 300 and 302 at location $DVc_a$ is $\Delta V_{Ca}$ which can be expressed as shown in Equation 2:

$$\Delta V_{Ca} = X_a I_{cb} \quad (2)$$

As described briefly above, in some cases it may be beneficial to flatten the voltage profile along the length of the feeder line 106. A "flatter" voltage profile is one that has a smaller difference between a starting point (e.g., substation bus) and a more remote location (e.g., $DVc_n$). Thus, as used herein, the term "flattening" as used herein refers to a process of adjusting the voltage profile to reduce the difference in voltages measure at two different locations. In one embodiment, this flattening can occur over the length of a feeder line.

Figure 4:
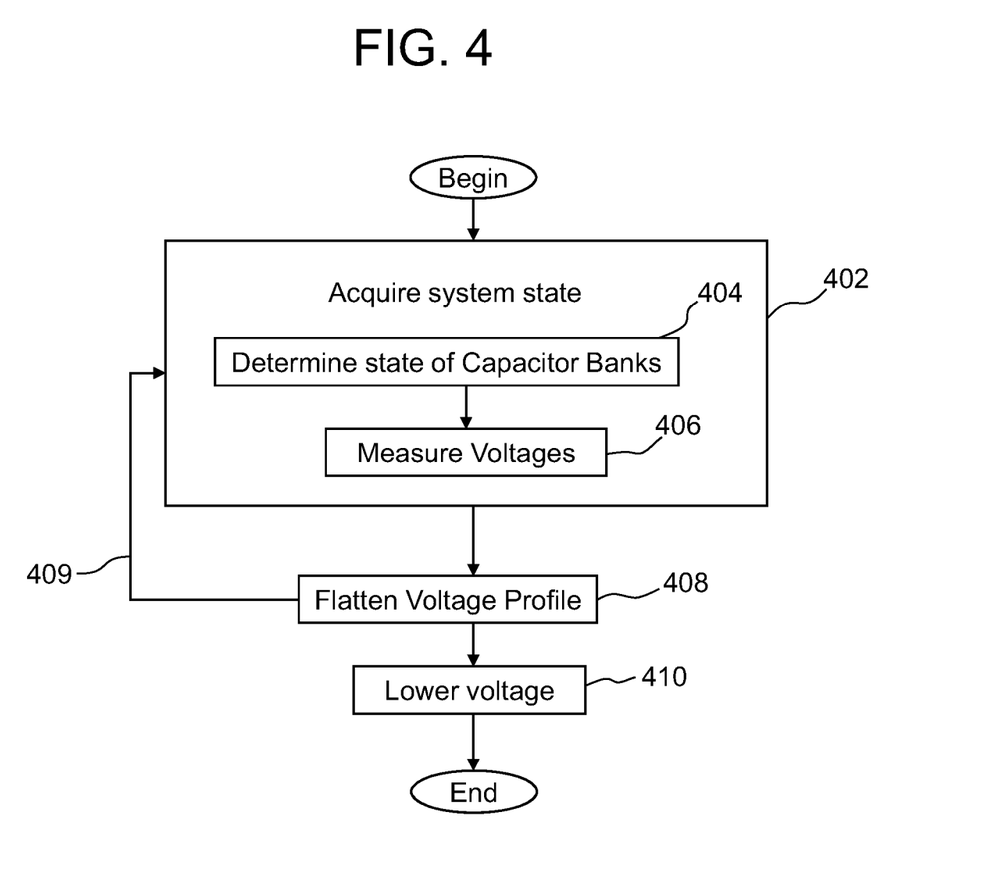
FIG. 4 is flow chart demonstrating a method of controlling capacitor banks in a distribution system.

FIG. 4 illustrates a method of controlling capacitor banks in a distribution system. The method begins at block 402 where the current state of the system is acquired. In this example, it shall be assumed that the system includes at least one distribution feeder (line) that includes two or more capacitor banks that can be coupled to it. As such, block 402 can include a capacitor bank status collection process 404 where current states of capacitor banks on the system are collected. As used herein, a capacitor bank is "on" if it is coupled to the distribution and "off" if it is disconnected. The state can also include, in one embodiment, the current set point for the capacitor banks. Of course, because the controller sent this information as will be described below, such information may already be known. It shall be understood that the method illustrated in FIG. 4 can be continuously or periodically performed so, in some cases, the state of the capacitor banks may already be known. The current voltages along a particular line can then be measured at process 406.

After the state of the system has been acquired, at block 408 the status of the capacitor banks can be varied to flatten the voltage profile along the line. In one embodiment, rather than causing the capacitor bank to connect or disconnect by sending a command, according to one embodiment, the voltage profile can be flattened by adjusting the set points of the capacitor banks. For example, if a capacitor bank is to be turned off, the set point could be lowered to a value that is less than the voltage currently experienced at the capacitor bank. Thus, under local control, the capacitor bank will determine that it is to disconnect itself. It shall be understood that flattening the voltage profile at block 408 can include an iterative process in one embodiment and as is illustrated by process flow connection 409. In some instances, flattening the voltage profile can allow for the entire profile to be lowered. For example, in some instances, and as illustrated by block 410, the voltage provided to the system (e.g., the voltage provided by substation 104 of FIG. 1) can be lowered. In one embodiment, the voltage can be lowered by adjusting either a transformer with LTC or voltage regulator.

Because the voltage profile has been flattened, the provided voltage can be lowered while still ensuring that consumers at the end of the line are receiving power with a voltage that exceeds the minimum requirement described above.

It shall be understood that the process of flattening the voltage profile in block 408 can take advantage of equations 1 and 2 described above to determine the effects of switching particular capacitor banks. In one embodiment, equations 1 and 2 can be used to determine how switching a particular capacitor bank will affect the voltages at some or all of the other locations along the line. According to one embodiment, the changes can be determined in advance and stored in a table as illustrated by Table 1 below. These voltage changes can be also directly measured every time a capacitor bank is switched in the field and recorded in a table such as Table 1.

TABLE 1

|       | $\Delta V_{Ca}$ | $\Delta V_{Cb}$ | ... | $\Delta V_{Ci}$ | ... | $\Delta V_{Cn}$ |
|-------|------|------|-----|-------|-----|-------|
| $C_a$ | 0.5 V | 0.5 V | ... | 0.5 V | ... | 0.5 V |
| $C_b$ | 0.75 V | 1.5 V | ... | 1.5 V | ... | 1.5 V |
| ...   | ... | ... | ... | ... | ... | ... |
| $C_i$ | 0.5 V | 1.25 V | ... | 2.25 V | ... | 2.25 V |
| ...   | ... | ... | ... | ... | ... | ... |
| $C_n$ | 0.75 V | 1.5 V | ... | 2.5 V | ... | 3.0 V |

In Table 1, it can be seen that, for example, switching capacitor $C_b$ in or out changes the voltage at all upstream capacitors (e.g., capacitor $C_a$) by 0.5V and at all down stream capacitors by 1.5V. In other embodiments, the changes can be calculated each time.

Figure 5:
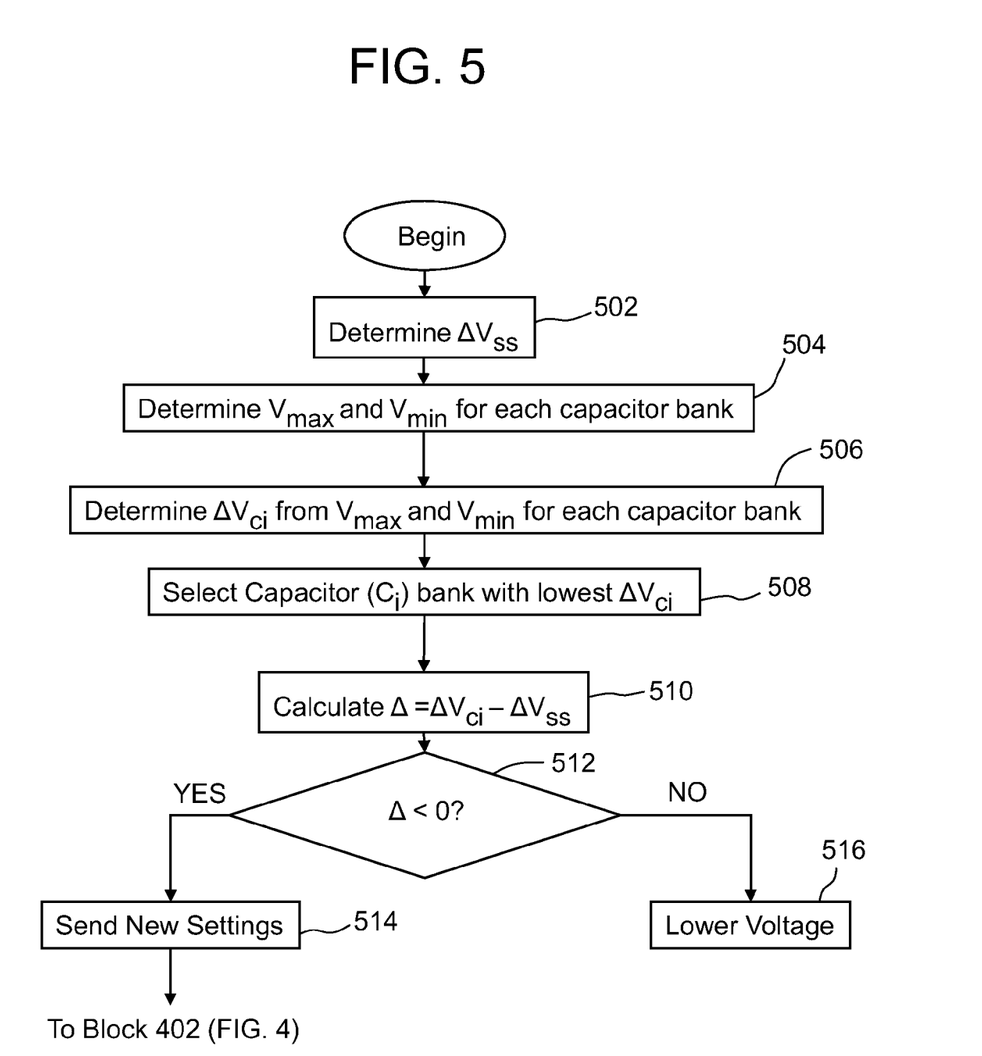
FIG. 5 is a flow chart demonstrating a method of flattening the voltage profile according to one embodiment.

FIG. 5 illustrates a method of flattening the voltage profile according to one embodiment. The method illustrated in FIG. 4 could be included, for example, in block 408 of FIG. 4. At block 502 the maximum and minimum values of voltages along the line are determined. This could be accomplished, for example, by extracting the maximum and minimum values from the voltages measured at process 406 of FIG. 4. At block 502, a value referred to herein as $\Delta V_{ss}$ can be formed based on the maximum and minimum values. In general, $\Delta V_{ss}$ will represent the voltage drop along the line and, the greater the drop, the greater the slope of the voltage profile. $\Delta V_{ss}$ can be determined in several ways including, for example, $V_{max(line)} - V_{min(line)}$ or $V_{avg(line)} - V_{min(line)}$ to name but a few. The subscript (line) in the previous variables indicates that those values are the maximum, minimum or average values measured over the entire line.

At block 504, for each capacitor bank along the line, the maximum and minimum voltages for all of the other capacitor banks along the line is determined with the capacitor banks simulated as switched in and switched out. Adding or subtracting the values shown in Table 1 above from the current voltages can make this determination, for example. Of course, these values could also be calculated rather than utilizing a table.

At block 506, a difference value referred to herein as $\Delta V_{ci}$ can be calculated from the minimum and maximum values determined at block 508. $\Delta V_{ci}$ can be determined by subtracting the minimum voltage value at each capacitor bank ($V_{min}$) from the maximum voltage value at each capacitor bank ($V_{max}$). Of course, other methods could be used to determine $\Delta V_{ci}$. The capacitor bank ($C_i$) having the lowest $\Delta = \Delta V_{ci} - \Delta V_{SS}$ is selected at block 510.

A $\Delta$ that is less than zero means that switching the particular capacitor bank $C_i$ will cause the voltage profile to flatten. Thus, if $\Delta$ is less than zero as determined at block 512, processing progresses to block 514 where new set points are sent to the capacitor banks. Block 512 is discussed further below. After block 512, processing returns to block 402 of FIG. 4. If $\Delta$ is greater than zero, there is no change that will result in a flatter voltage. As such, and if desired, processing can progress to block 516 where the voltage along the line is lowered. In some cases, however, processing can end rather than progress to block 516. Block 516 is discussed in greater detail below.

Figure 6:
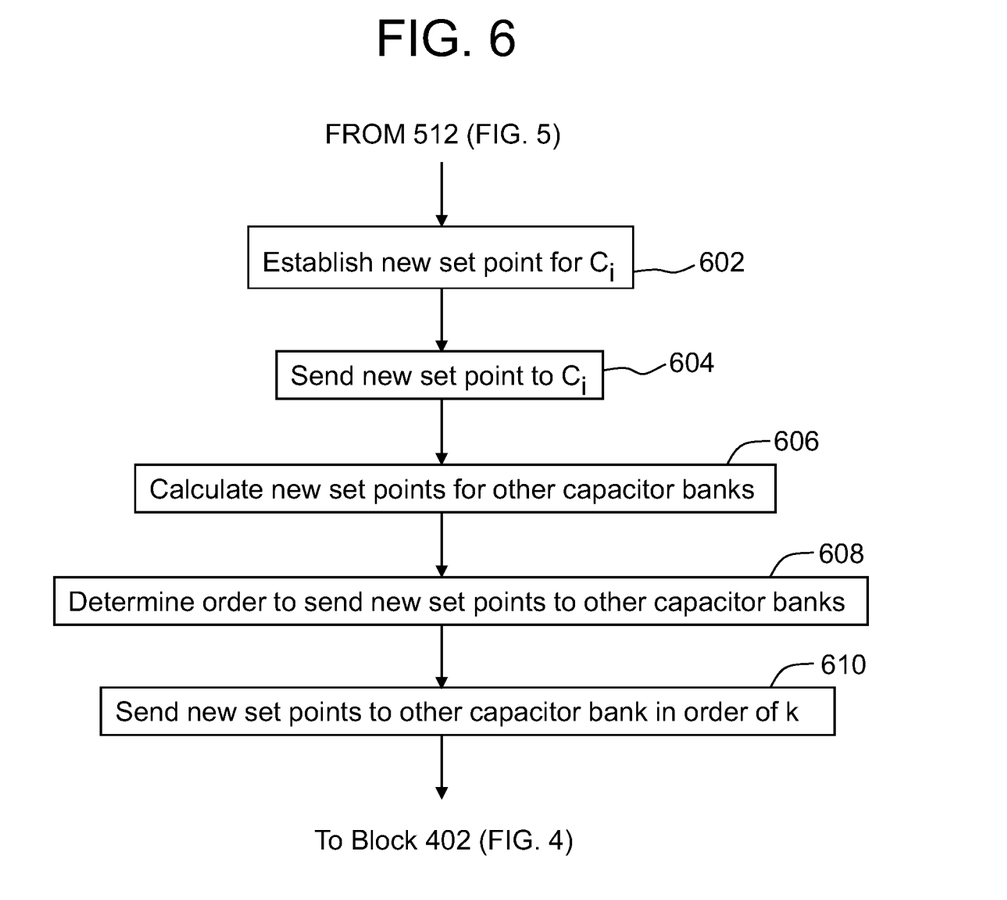
FIG. 6 is a flow chart demonstrating a method of determining the maximum and minimum voltages for all of capacitor banks along the line as individual capacitor banks are switched in and out.

FIG. 6 illustrates the processing that can occur in block 514. In particular, at block 602 a new set point is determined. This set point is voltage that will cause the desired switch to occur. For example, the new set point can be selected to be above the current voltage at the capacitor bank (and above the current set point) if the capacitor bank is to be switched in and below the current voltage if the opposite is desired. In one embodiment, each capacitor bank has a bandwidth around its set point that establishes upper and lower threshold values to determine when the capacitor bank will be switched in/out. As such, it shall be understood that the new set point can be selected to take this bandwidth into account. These new setting are sent to capacitor $C_i$ at block 604. In one embodiment, the settings also include a new bandwidth value that is equal to $\Delta V_{ci}$. Of course, the bandwidth value could include a constant added to it. The settings can also include a delay time Td which the capacitor bank will delay before switching to prevent the capacitor from switching too quickly to perturbations caused, for example, by transients or other line disturbances.

At block 606 the new set points for each of the other capacitor banks is calculated. This calculation can include, for example, adjusting the current set points up or down based on the projected effect of switching the status of $C_i$.

At block 608 an order for sending the new set points for the other capacitor banks is determined. The ordering of sending the set points is important because it reduces the number of switching operations and reduces the voltage variations along the feeder. In one embodiment, the order is determined based on equation 3:

$$k = \frac{Q_{MAX}}{Q} * \frac{\text{feeder length}}{\text{distance from the substation}}$$

where $Q_{MAX}$ is the value of reactive power for the largest capacitor bank on the line, Q is the value of reactive power for a particular capacitor bank on the line; feeder length is the distance between the voltage source (e.g., substation 104 illustrated in FIG. 1) and capacitor farthest from the voltage source; distance from the substation is the distance of the particular capacitor from the voltage source (i.e., the substation).

At block 610, the new set points are sent to the capacitor banks in the order of ascending factor k. In one embodiment, the new set points include new time delay that are equal to Td plus a value (e.g. 15 seconds) time the ordinal ranking of the capacitor banks based on k values. This builds in a time delay that can allow the system to settle in the event that a low k valued capacitor bank switches.

Figure 7:
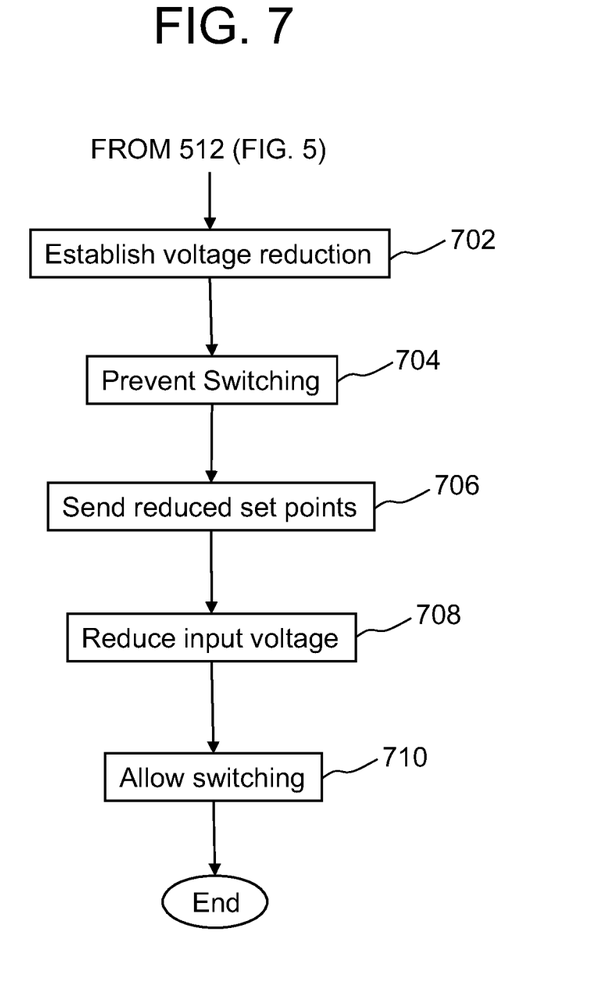
FIG. 7 is a flow chart demonstrating a method of lowering the voltage at all locations along a distribution feeder.

FIG. 7 illustrates an example of processing that can occur in block 516 of FIG. 5. At block 702 an amount to reduce the input voltage to the line is determined. In one embodiment, the voltage can be reduce by an amount such that $V_{min(line)}$ is above the lowest required voltage. It shall be understood that flattening the voltage as described above can increase the amount by which the voltage can be decreased. In one embodiment, the voltage can be reduced to about 116 or 119 volts.

At block 704, all of the capacitor banks are sent a signal that prevents them from switching. Then, at block 706, new set points that for each capacitor are determined. In a simple example, the new set points are merely the existing set points reduced by the amount of the voltage reduction. The order that the new set points (and adjustment of time delays) can be based on the k value as described above. At block 708 after all of the set points have been sent, the new voltage is provided and then, at block 710, the capacitor banks are sent a signal that allows them to begin switching again.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for controlling voltage on a distribution feeder, the distribution feeder including a plurality of capacitor banks associated with the distribution feeder, the plurality of capacitor banks including a first capacitor bank and a second capacitor bank, the first capacitor bank being configured to connect to the distribution feeder when a first voltage is below a first lower threshold value and to disconnect from the distribution feeder when the first voltage is above a first upper threshold value, the first upper threshold value and first lower threshold value being determined based on an operational set point of the first capacitor bank, the method comprising:
   determining at a computing device the operational state of the first and second capacitor banks;
   measuring the first voltage with a voltage sensor associated with the first capacitor bank;
   determining whether the first capacitor bank should be connected to or disconnected from the distribution feeder; and
   sending a first instruction to the first capacitor bank, the first instruction causing the first capacitor bank to vary its operational set point.

2. The method of claim 1, wherein the operational state is one of connected or not connected.

3. The method of claim 2, wherein determining whether the first capacitor bank should be connected to or disconnected from the distribution feeder includes:
   determining that operational state is connected; and
   determining that disconnecting the first capacitor bank will flatten a voltage profile of the distribution feeder.

4. The method of claim 3, sending includes sending the first instruction such that it causes the first capacitor bank to increase its operational set point.

5. The method of claim 2, wherein determining whether the first capacitor bank should be connected to or disconnected from the distribution feeder includes:
   determining that operational state is disconnected; and
   determining that connecting the first capacitor bank will flatten a voltage profile of the distribution feeder.

6. The method of claim 5, wherein sending includes sending the first instruction such that it causes the first capacitor bank to decrease its operational set point.

7. The method of claim 1, further comprising:
   after sending the first instruction to the first capacitor bank to cause it to vary its operational set point, sending a hold instruction to one or more of the plurality of capacitor banks that disallows them from changing operational status;
   determining a lower input voltage for the distribution feeder; and
   sending a second instruction to the first capacitor bank to decrease its operational set point.

8. The method of claim 7, wherein the lower input voltage is between 126 and 114 volts.

9. The method of claim 7, wherein the lower input voltage is lower than a current input voltage by a voltage difference and the second instruction causes the first capacitor bank to lower its operational set point in an amount equal to the voltage difference.

10. The method of claim 7, further comprising:
    sending a release instruction to the one or more of the plurality of capacitor banks that allows them to change operational status.

11. A system for controlling voltage on a distribution feeder, the system comprising:
    a plurality of capacitor banks that can be connected to or disconnected from the distribution feeder, the plurality of capacitor banks including a first capacitor bank and a second capacitor bank, the first capacitor bank being configured to connect to the distribution feeder when a first voltage is below a first lower threshold value and to disconnect from the distribution feeder when the first voltage is above a first upper threshold value, the first upper threshold and first lower threshold being determined based on an operational set point;
    a sensor configured to measure the first voltage; and
    a controller in operable communication with the plurality of capacitor banks configured to determine the operational state of the first and second capacitor banks and, based on the first voltage, send a first instruction to the first capacitor bank, the first instruction causing the capacitor bank to vary the operational set point.

12. The system of claim 11, wherein the controller is configured to determine whether the first capacitor bank should be connected to or disconnected from the distribution feeder based on a determination that an operational state of the first capacitor bank is connected and a determination that disconnecting the first capacitor bank will flatten a voltage profile of the distribution feeder.

13. The system of claim 12, wherein the controller is configured to send the first instruction such that it causes first the capacitor bank to increase the operational set point.

14. The system of claim 11, wherein the controller is configured to determine whether the first capacitor bank should be connected to or disconnected from the distribution feeder based on a determination that an operational state of the first capacitor bank is disconnected and a determination that connecting the first capacitor bank will flatten a voltage profile of the distribution feeder.

15. The system of claim 14, wherein the controller is configured to send the first instruction such that it causes first the capacitor bank to decrease the operational set point.

* * * * *